UNITED STATES PATENT OFFICE.

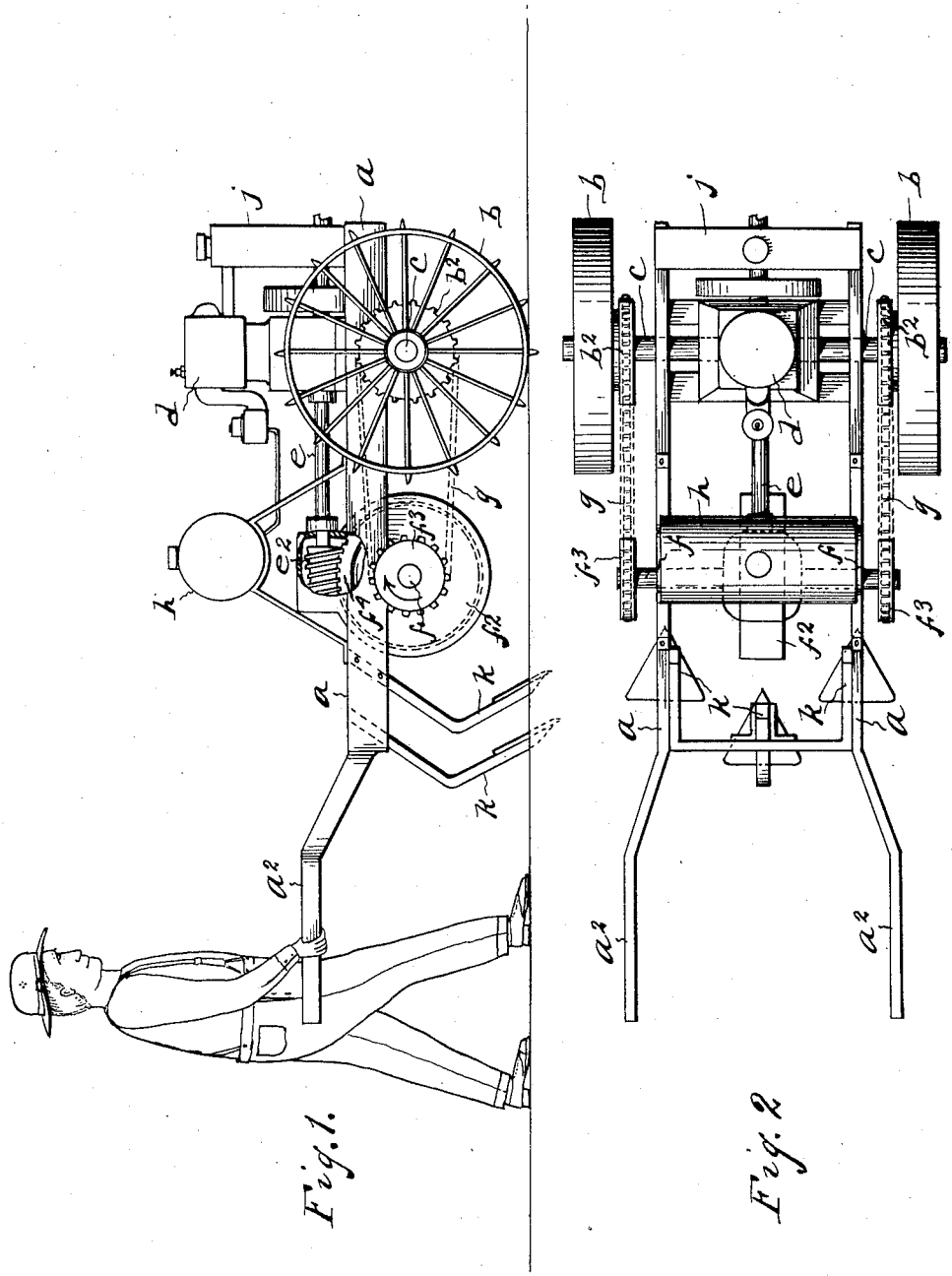

WALFORD LARSON, OF DETROIT, MICHIGAN.

CULTIVATOR.

1,344,804.   Specification of Letters Patent.   Patented June 29, 1920.

Application filed April 14, 1919. Serial No. 290,020.

*To all whom it may concern:*

Be it known that I, WALFORD LARSON, a citizen of the United States, residing at Detroit, county of Wayne, State of Michigan, have invented a certain new and useful Improvement in Cultivators, and declare the following to be a full, clear, and exact description of the same, such as will enable others skilled in the art to which it pertains to make and use the same, reference being had to the accompanying drawings, which form a part of this specification.

My invention relates to agricultural apparatus and I have shown it in the accompanying drawing and will describe it in the following specification embodied in a cultivator.

A special object of my improvements is to provide an efficient power cultivator of low cost and light weight especially adapted for use where the area to be cultivated is of moderate extent.

I secure this object in the device illustrated in the accompanying drawing in which:

Figure 1 is a wide elevation of the cultivator embodying my invention in operative position.

Fig. 2 is a plan view of the cultivator shown in Fig. 1.

$a$ is a frame resting toward its forward end on an axle $c$. $b$ $b$ are driving wheels on the axle $c$. $b^2$ $b^2$ are sprocket wheels connected with the driving wheels $b$ $b$ concentric therewith and on the inner side of the same.

$d$ is an internal combustion engine located on the frame $a$ above the axle $c$ or just in front of the same. $e$ is a transmission shaft extending from the engine $d$ toward the rear of the frame $a$ and having a worm $e^2$ on its end. $f$ is a jack-shaft located upon the frame $a$ toward the rear of said frame. $f^2$ is a differential casing which may inclose a differential mechanism joining the two sections of the jack-shaft $f$. $f^4$ is the main wheel of the differential mechanism which is provided with worm teeth around its periphery with which teeth the worm $e^2$ engages. $f^3$ $f^3$ are sprocket wheels on the ends of the shaft $f$. $g$ $g$ are sprocket chains passing over the sprocket wheels $f^3$ $b^3$ so as to actuate the driving wheels $b$.

$a^2$ $a^2$ are handles extending outward and upward from the rear end of the frame $a$ into position to be grasped by the operator to manipulate the apparatus as illustrated in Fig. 1. $k$ $k$ are the cultivator blades.

Of course any other earth-working tool may be substituted for the cultivator blades.

$h$ is the reservoir for liquid fuel and $j$ is the radiator.

The operation of the above described device is as follows:

The handles $a^2$ are grasped by the operator to hold the frame $a$ in its proper position, the cultivator blades properly engaging the earth. The engine $d$ being set in motion the jack-shaft $f$ is rotated, the motion of which is conveyed through the sprocket chains $g$ to the front wheels thus propelling the apparatus and forcing the blades $k$ through the earth.

In the above described device the blades $k$ may be held accurately to their position. The tension on the lower strand of the chains $g$ acting to prevent any tendency to lift said blades by rotating the frame $a$ around the axle $c$. The whole apparatus may weigh between two and three hundred pounds and may be constructed at a reasonable price and it forms an efficient apparatus adequate for all ordinary requirements.

The worm gearing connection between the engine and jack-shaft and the sprocket gearing leading back to the driving wheels, forms a very compact and powerful mechanism especially adapted to the purpose of the apparatus.

The relative position of the engine on the frame may be selected to balance the construction.

I have shown a vertical engine the crank shaft extending directly in line with the transmission shaft so as to permit direct connection of said shafts.

What I claim is:

1. In an apparatus of the kind described, a frame resting upon a single axle, driving wheels on said axle, an internal combustion engine on said frame vertically above said axle, means extending from said frame to be operated rearwardly from said axle, said frame being provided with handles to be grasped by the operator, a jack shaft on said frame between said handles and axle, said shaft being provided with a differential gear having a master wheel at its center, a worm shaft extending directly from said engine and having a worm on its end remote from the engine engaging corresponding teeth on said master wheel and sprocket chains and wheels for conveying the power from said jack shaft to said driving wheels.

2. In an apparatus of the kind described, a frame resting upon a single axle, driving wheels on said axle, an internal combustion engine on said frame directly above said axle, means extending from said frame to be operated rearwardly from said axle, said frame being provided with handles to be grasped by the operator at the rear end of said frame, a jack shaft on said frame between said handles and axle, said jack shaft being provided with a differential gear at its center having a master wheel, a transmission shaft having a worm at its rear end engaging teeth on said master wheel, said transmission shaft extending directly to said engine, the crank shaft of said engine extending in line with said transmissison shaft substantially as and for the purpose described.

In testimony whereof, I sign this specification.

WALFORD LARSON.